> 3,492,720
> PRODUCTION OF POROUS ELECTRODES
> Harald Guthke, Frankenthal, Pfalz, Wolfgang Habermann, Mainz, Karl-Heinz Nitzschke, Ludwigshafen (Rhine), and Rolf Schellenberg, Mannheim, Germany, assignors to Badische Anilin- & Soda-Fabrik Aktiengesellschaft, Ludwigshafen (Rhine), Rhineland-Palatinate, Germany
> No Drawing. Filed Nov. 1, 1966, Ser. No. 591,080
> Claims priority, application Germany, Nov. 9, 1965, 1,282,005
> Int. Cl. H01s 4/00
> U.S. Cl. 29—592                               4 Claims

ABSTRACT OF THE DISCLOSURE

Process for the production of porous electrodes, especially cathodes for fuel cells or electrochemical measuring cells, by applying by the plasma spraying process to a shaped article in the form of a layer a mixture of tungsten, titanium or alloys thereof as the active components and aluminum oxide, zirconium oxide or thorium oxide or mixtures thereof, and subsequently removing the shaped article from the layer obtained.

---

The present invention relates to electrodes, especially cathodes for fuel cells or electrochemical measuring cells, and particularly to a process for the production of such electrodes.

As cathodes for fuel cells in which an electrolyte containing caustic alkali solution is used, chiefly silver electrodes and electrodes of various types of carbon are employed. In continuous operation such fuel cells can only be run with fuels which do not form carbonate in the reaction and are free from carbon dioxide. If this is not the case, the pH value of the electrolyte is continually changed by the alkali metal carbonates formed. This may for example result in the fact that dehydration reactions at the anode are terminated and deposits are formed on the electrodes or in the electrolyte. Only fuels such as hydrogen and hydrazine can be reacted in these cells, whereas the use of inexpensive fuels such as alcohols and olefins is not possible for the reasons given above. Moreover, these fuel cells cannot be operated with highly corrosive gases, such as nitrous gases, since the cathodes are not sufficiently corrosion-resistant.

In fuel cells with an acidic electrolyte, which do not have the said disadvantages with regard to the electrolyte, the abovementioned cathode materials are unsuitable for the reaction of oxygen since they are not sufficiently corrosion-resistant. In this case active platinum is used as the active material. Platinum has no selectivity however so that it is possible to react at platinum electrodes substances which can be reduced at the cathode as well as substances which can be oxidized at the anode. Such non-selective electrodes must therefore not come into contact with the fuel; they have to be protected for example by diaphragms, which means further loss in efficiency and additional expense. Moreover, platinum-containing cathodes are very sensitive to the action of catalyst poisons, such as hydrogen sulfide. Such catalyst poisons are frequently formed in fuel cells which contain highly concentrated sulfuric acid as electrolyte and which are operated with hydrocarbons on the anode side.

It is also known that titanium or its alloys with molybdenum and/or tungsten can be used as the material for cathodes of electrochemical cells for determining the oxygen content of gases or vapors. These electrodes consist of solid metal. The production of porous, preferably homoporous, electrodes from these materials has hitherto presented considerable difficulties owing to their high melting points and high sensitivity to oxidation.

It is an object of the present invention to provide a simple and economical process for the production of homoporous electrodes which contain titanium or tungsten or alloys or mixtures of these metals as active material and which can be used as cathodes in fuel cells and in electrochemical measuring cells.

This object can be achieved by applying a mixture of the active components and metal oxides which cannot be reduced with hydrogen and are at least difficultly soluble in water, acids or bases, to a shaped article to form a layer by the plasma spraying process and then removing the shaped article from the layer obtained.

Examples of particularly suitable metal oxides which cannot be reduced with hydrogen and are difficultly soluble in water, acids and bases are aluminum oxide, zirconium oxide or thorium oxide. It is advantageous to add these oxides to the metals in an amount of about 1 to 20% by weight. The addition of these oxides ensures that the layer applied to the shaped article has a large active surface. The thickness of the layer should not exceed 2 mm. and is advantageously about 0.5 to 1 mm.

The articles to which the layers are applied may be of any geometrical shape, e.g. thin-walled tubes, wires, sheets, coils, netting and the like. The shaped articles should consist of a soluble material so that they can be separated from the layer which has been applied to them and which constitutes the electrode proper. They are preferably made of iron or copper. For removing the shaped articles made of these materials, an oxidizing acid, preferably 30 to 60% aqueous nitric acid, is advantageously used. The shaped articles may also consist for example of aluminum or zinc. In this case they are removed by means of caustic alkali solutions.

Examples of suitable arc gases for the plasma burner are argon and nitrogen. Nitrogen containing about 30 to 500 p.p.m. of oxygen is particularly suitable. Electrodes prepared with this arc gas are particularly corrosion-resistant while having the same catalytic activity; this is due to the formation of oxide and nitride on the surface of the active components.

In order to obtain a particularly large three-phase interface between the gas, the electrolyte and the active material, it is advantageous to coat one side of the electrodes with a 0.1 to 0.5 mm. thick porous layer of a metal oxide which is insoluble in the electrolyte concerned.

The porosity of the electrode to be prepared can be controlled in a simple way by adjusting the temperature of the plasma burner, the particle size of the metals employed and the ratio of metal to insoluble metal oxide. The porosity of electrodes to be prepared from a given mixture increases as the temperature of the plasma burner rises. It is affected in the same way by an increase in particle size or in the content of difficultly soluble or insoluble metal oxides. The particle size of the metals may be varied within the range of about 20 to about 100 microns. The same applies to the difficultly soluble metal oxides. The porosity of the electrodes can be further increased by adding to the mixture to be sprayed substances which are stable at the temperatures of the plasma burner and can easily be dissolved out after spraying. These substances may be added to the mixture in an amount of 0.1 to 25% by weight with reference to the metals contained in it. Examples of suitable substances of this type are copper, iron, zinc and alkaline earths.

To improve their electrochemical properties, the electrodes may be impregnated either with inorganic substances having ion-exchanging properties, e.g. zirconium oxy compounds, or with organic compounds into which ion-exchanging groups have been introduced, e.g. halomethylated polystyrenes, after the shape articles have been removed.

The process according to this invention makes it possible to produce electrodes of any geometrical shape and having reproducible properties in a simple and econimical manner. The porosity of the electrodes can be varied in a simple way. The electrodes prepared by the process according to this invention are extremely resistant to corrosion and they may be employed for reacting not only oxygen and nitrous gases but also oxidizing acids, such as nitric acid, oxidizing compounds, such as peroxides and ozone, as well as halogens, without any corrosion being noticeable.

The invention is further illustrated by the following examples.

Example 1

(a) A mixture of 90% by weight of titanium having a particle size of 60 to 90 microns and 10% by weight of γ-aluminum oxide having a particle size of 40 to 70 microns is applied by means of a plasma burner to a copper tube 35 mm. in length and 12 mm. in diameter so that a layer 1 mm. in thickness is formed. 15 dm.$^3$/min. of commercially pure nitrogen is used as arc gas and 1 dm.$^3$/min. of argon as powder injection gas. The burner is operated at an amperage of 180 and a voltage of 45. The copper tube is then removed by the action of 45% aqueous nitric acid at about 50° C. The remaining porous tube consisting of titanium and aluminum oxide is dried and then cleaned by treatment with a mixture of 2 parts by weight of carbon tetrachloride and 1 part by weight of toluene.

The tube, which serves as a measuring electrode, is impregnated with a 10% potassium bicarbonate solution and employed as oxygen electrode in a galvanic cell. In this cell the external surface of the tube is surrounded by a 10% potassium bicarbonate solution as electrolyte. The counter-electrode in the electrolyte is an iron-cadmium anode. A gas sample consisting of a mixture of nitrogen and oxygen is passed through the interior of the tube. The current generated by the galvanic cell in dependence on the oxygen content of the gas is measured by means of a low-ohmage recording instrument with locking device having an internal resistance of 165 ohms and an input voltage of 5 millivolts.

The following amperage are obtained in dependence on the oxygen content of the gas mixture:

| Percent $O_2$ | 20.8 | 19 | 17 | 15 |
|---|---|---|---|---|
| Microamperes | 6920 | 6250 | 5580 | 4920 |

When the oxygen concentration is changed, initial response occurs in about 2 seconds and response is complete after about 22 seconds.

(b) A porous layer of titanium is applied to the copper tube described in Example 1(a) by means of a plasma burner under the same operating conditions as in Example 1(a). After removal of the copper a tube is obtained which is used in a galvanic cell as described in Example 1(a).

The following amperages are measured with this tube in dependence on the oxygen concentration:

| Percent $O_2$ | 20 | 19 | 17 | 15 |
|---|---|---|---|---|
| Microamperes | 3270 | 2980 | 2610 | 2290 |

When the oxygen concentration is changed, initial response occurs in about 8 seconds and response is complete after about 170 seconds.

Example 2

The following materials are applied to four copper tubes 12 mm. in diameter and 14 mm. in length as described in Example 1(a) so that a layer 1 mm. in thickness is formed.

Tube 1—pure titanium, particle size 60 to 90 microns
Tube 2—95% by weight of titanium, particle size 60 to 90 microns, 5% by weight of aluminum oxide, particle size 40 to 60 microns
Tube 3—90% by weight of titanium, particle size 60 to 90 microns, 10% by weight of aluminum oxide, particle size 40 to 60 microns
Tube 4—85% by weight of titanium, particle size 60 to 90 microns, 15% by weight of aluminum oxide, particle size 40 to 60 microns.

The copper tubes are then removed in 45% nitric acid at about 50° C., as described in Example 1(a).

The electrical resistances of these porous tubes containing titanium are as follows:

Tube 1—about 0.1 ohm
Tube 2—about 0.04 ohm
Tube 3—about 0.06 ohm
Tube 4—about 0.08 ohm The external surfaces of the tubes are surrounded by an electrolyte consisting of 1 part by volume of 30% sulfuric acid and 1 part by volume of 65% nitric acid and polarized. The following cathodic amperages are measured in dependence on the polarization:

|  | Cathodic amperage, milliamperes | Polarization, millivolts |
|---|---|---|
| Tube 1 | 100 | 390 |
|  | 300 | 590 |
|  | 500 | 650 |
| Tube 2 | 100 | 200 |
|  | 300 | 338 |
|  | 500 | 440 |
| Tube 3 | 100 | 140 |
|  | 300 | 235 |
|  | 500 | 342 |
| Tube 4 | 100 | 120 |
|  | 300 | 225 |
|  | 500 | 320 |

When using an electrolyte consisting of 98.5 parts by volume of 30 wt. percent aqueous sulfuric acid and 1.5 parts by volume of 96 wt. percent nitric acid and passing nitrous gases having a $NO_2$ content of about 80% by volume through tube 3, the following values are measured:

Cathodic amperage—500 milliamperes
Polarization—about 300 millivolts

Example 3

A mixture of tungsten having a particle size of 40 to 60 microns and γ-aluminum oxide having a particle size of 40 to 60 microns is applied by means of a plasma burner to a copper tube 14 mm. in diameter and 10 mm. in length so that a layer 1 mm. in thickness is formed. The mixture contains 97.5% by weight of tungsten. 15 dm.$^3$/min. of commercially pure nitrogen is used as arc gas and 5 dm.$^3$/min. of argon is used as powder injection gas. The burner is operated at an amperage of 150 and a voltage of 45.

The copper tube is removed from the layer by means of 45% aqueous nitric acid at 50° C. The remaining porous tube consisting of tungsten and aluminum oxide is dried and then cleaned by treatment with a mixture of 2 parts by weight of carbon tetrachloride and 1 part by weight of toluene.

The tube is closed at both ends and immersed in an electrolyte consisting of 10 molar aqueous nitric acid saturated with sodium nitrate.

The amperage of this electrode in dependence on its voltage, with reference to the standard hydrogen electrode, is given in the following table.

TABLE

| $\epsilon$[mv.] | 1175 | 995 | 950 | 862 | 799 | 774 | 689 |
|---|---|---|---|---|---|---|---|
| $I$[ma.] | 0 | 50 | 100 | 200 | 300 | 400 | 500 |

We claim:
1. A process for the production of porous electrodes containing titanium, tungsten or mixtures of these metals as active components for use in fuel cells or electrochemical measuring cells, which comprises applying by the plasma spraying process in the form of a layer on a shaped article a mixture of a metal selected from the group consisting of titanium, tungsten and mixtures of titanium and tungsten and 1 to 20% by weight of a metal oxide selected from the group consisting of aluminum oxide, zirconium oxide, thorium oxide and mixtures thereof, and removing the shaped article from the layer obtained.

2. A process as claimed in claim 1 wherein the shaped aritcle consists of copper or iron.

3. A process as claimed in claim 1 wherein the shaped article is removed by dissolution in an oxidizing acid.

4. A process as claimed in claim 1 wherein the mixture additionally contains substances which are not decomposed at the temperatures of the plasma burner and are soluble in water, acids or bases.

References Cited

UNITED STATES PATENTS

| | | | |
|---|---|---|---|
| 3,039,177 | 6/1962 | Burdett | 29—627 |
| 3,318,730 | 5/1967 | Kreiselmaier | 136—120 |
| 3,335,025 | 8/1967 | Rightmire et al. | 136—86 |
| 3,336,181 | 8/1967 | Falkenau et al. | 136—120 |
| 3,350,294 | 10/1967 | Hall et al. | 136—120 |
| 3,356,912 | 12/1967 | Rairden et al. | 29—570 |

FOREIGN PATENTS 654,294  12/1962  Canada.

JOHN F. CAMPBELL, Primary Examiner

R. B. LAZARUS, Assistant Examiner

U.S. Cl. X.R.

136—120